United States Patent
Bielski et al.

[19]

[11] Patent Number: 5,880,375
[45] Date of Patent: Mar. 9, 1999

[54] APPARATUS AND METHOD FOR MEASURING MULTI-PHASE FLOW

[76] Inventors: Roman Bielski, 1308 Sheridan Rd., Coopersburg, Pa. 18036; John Carter, 5005 Riverway, Suite 440, Houston, Tex. 77056

[21] Appl. No.: 967,421

[22] Filed: Nov. 10, 1997

Related U.S. Application Data

[60] Provisional application No. 60/058,558 Sep. 11, 1997.

[51] Int. Cl.[6] ................................................ G01F 1/708
[52] U.S. Cl. .................................................. 73/861.05
[58] Field of Search ........................... 73/861.05, 861.41

[56] References Cited

U.S. PATENT DOCUMENTS

| | | | |
|---|---|---|---|
| 4,096,745 | 6/1978 | Rivkin et al. | 73/194 B |
| 4,223,727 | 9/1980 | Sustek, Jr. et al. | 166/250 |
| 4,228,855 | 10/1980 | Sustek, Jr. et al. | 166/250 |
| 4,861,986 | 8/1989 | Arnold | 250/260 |
| 5,543,617 | 8/1996 | Roscoe et al. | 250/259 |
| 5,711,900 | 1/1998 | Jones | 252/408.1 |
| 5,814,468 | 9/1998 | Siiman et al. | 435/7.21 |

*Primary Examiner*—William Oen
*Assistant Examiner*—Jewel Thompson
*Attorney, Agent, or Firm*—Gunn & Associates, P.C.

[57] ABSTRACT

This invention is related to the measurement of flow rates and component fractions of individual phases of a composite fluid. More particularly, the invention is directed toward apparatus and methods for determining the volumetric flow rate or mass flow of one or more phases of a fluid by measuring the activity, as a function of time, of one or more specific radioactive isotopes affected by a specific phase of the flowing fluid stream. Radioactive phase isotope material is deposited upon one or more inserts, and each deposition of phase isotope material is coated with a corresponding phase coating. Each phase isotope and corresponding phase coating is soluble in only one phase of the multi-phase flow. The inserts are then inserted into the multi-phase flow, and the time required for each flow phase to wash the corresponding phase coating from the insert is measured by the release of the corresponding phase isotope into the flow stream. Phase flow parameters of interest are then computed from the measured phase release times.

33 Claims, 4 Drawing Sheets

APPARATUS AND METHOD FOR MEASURING MULTI-PHASE FLOW

This application claims benefit of provisional application 60/058,558 filed Sep. 11, 1997.

BACKGROUND OF THE INVENTION

This invention is related to the measurement of flow rates and component fractions of individual phases of a composite fluid. More particularly, the invention is directed toward apparatus and methods for determining the volumetric flow rate or mass flow of one or more phases of a fluid by measuring the activity, as a function of time, of one or more specific radioactive isotopes affected by a specific phase of the flowing fluid stream.

BACKGROUND OF THE ART

Fluid flow meters are used in many areas of industry and commerce. Various nuclear, acoustic, electromagnetic, mechanical and electronic techniques have been used to measure linear flow velocity, volumetric flow rates, and mass flow of fluids containing one, two, or more components or "phases" such as water, natural gas and crude oil. The multiple phase, or "multi-phase" flow meters are especially important to the petroleum industry.

Orifice type flow meters are widely used to measure single phase flow, such as fluids comprising 100% liquid, and are used extensively for 100% gas in the natural gas industry. In orifice flow meters, fluid is forced to flow through an orifice in a plate within the flow conduit, creating a pressure drop across the plate. Orifice flow meters are relatively inexpensive to fabricate and to maintain, and are reliable in many types of field operations. In addition, the physical size of most orifice devices is relatively small. Measures of the differential pressure across the plate, along with flow stream pressure and temperature measurements, are used to compute flow rate using equations well known in the art.

Orifice plates are virtually impossible to use in multi-phase stream flow because of the effect the concentric restriction has by "damming" the liquid flow in front of the plate, and the resulting pooling of liquids downstream of the plate. Little success has been indicated in tests, even of high gas fraction multi-phase flow where the gas and vapors constitute more than 98% of the fluids. Any amount of free liquids corrupts generation of a representative differential pressure, and therefore corrupts the resulting flow calculations from these differential pressure measurements. Liquids change the effective pipe diameter, the orifice diameter, the beta ratio of the orifice meter, the pipe roughness and the shape of the vena contracta, and thus the entire flow equation at spazemotic intervals depending on the relative velocities of the phases. At present, there is no "state-of-the art" software or flow equation that can adequately represent multi-phase flow through an orifice plate, even utilizing any existing type of fractional flow determination device.

The venturi, another inferred flow measurement device utilizing differential pressure, can be used to measure multiphase flow only if an independent measure of the ratio of the phases is made. Furthermore, accurate measures of volumetric flow rates of each phase can be obtained if the linear flow velocities of the phases are the same, or the relative "slippage" of the linear phase flows can be determined, or all phases are forced to flow at the same linear flow velocity at the position which the phase ratio and differential pressure measurements are made. All existing multi-phase flow technology that utilizes an inferred flow measurement from differential pressure is done with some special designs of venturi tubes. Virtually all comments made concerning orifice measurements are also applicable to venturi flow measurement.

Positive displacement type flow meters force fluid to flow through a positive volumetric apparatus, and the flow rate of the fluid is determined from the rate of revolution of the displacement device. Positive displacement type meters are used in a multi-phase flow meter. As with venturi flow meters, independent phase ratio measurements must be made using a variety of technologies. The positive displacement meter forces all phases of the flow to move through the meter at the same velocity. These velocities can change quite readily in slug flow, but both the gas and the liquids are at the same flow rate (velocity) at the moment in time as they pass through the meter. The relative ratio of the liquids and the gas to liquids must be obtained at close to the same time in order to obtain the desired multi-phase flow measurements. Positive displacement meters are more complex than venturi flow meters, are more costly to manufacture and to maintain, and are in general larger in physical size.

Tracers have also been used in prior art multi-phase flow measurements. Various materials, usually referred to as "tracers" or "tags", are introduced into a flowing stream comprising one or more phases. Tracers can be radioactive or stable elements or compounds. Preferably, a specific tracer binds to only a specific phase of the composite flow. Detectors, which respond to tracer concentration, are placed downstream from the point of tracer injection. Measured tracer concentration is then related to the flow rate of the phase which the tracer tags. Usually relatively large amounts of tracer material must be injected into the flowing stream to obtain statistically significant measurements. This is especially a problem if radioactive tracers are employed, since the fluid is essentially contaminated with radioactive material. In addition, and as is the case with venturi flow meters, numerous assumptions must be made and/or numerous additional independent measurements must be made in order to convert measured tracer concentration into multi-phase volumetric or mass flow measurements.

Separators are widely used in multiple-phase flow measurements. As an example, in the petroleum industry, it is of interest to measure volumetric flow rates of the three fluids produced, namely oil, gas and water. Gravity separators are widely used to separate these three components of differing density, and then the separated components are each drawn from the separator and single phase flow measurements are made on each separated components. Characteristically, separators are physically large, are expensive to construct, require a relatively long period of time for the multiple phases to separate by means of the force of gravity, and require a separate flow meter for each separated phase. In addition, separators have an inherent error because of entrained or solution gas, and carry over from one phase to another. As examples, some water can remain within an oil phase, and gas can remain dissolved within the liquid phases. The test separator is capable of giving definitive answers to three phase flow measurements only if all of the various factors of the three meters measuring the various flows are considered. Such factors include the dump rates for the liquids being five to ten times the average flow rate, the entrained gas in both the water and oil phases expanding as the pressure is lowered going through the separator and meters and thereby over-registering the volume of liquids, liquids being carried through the gas meter by the higher gas velocity and insufficient demisting, and changes in the liquid levels due to slugging which results in insufficient separation. These factors are more often than not disregarded, and result in a large percentage of test separator testing on producing wells which overstate the volumes from a nominal 10% to values exceeding 100% when compared to sales volumes. In addition, the test separator requires massive, heavy, costly equipment, significant size and time for complete phase separation, and is certainly not applicable for real time, pipeline measurements where there often are sudden changes in the flow phase composition and the flow regime.

Various two and three phase "in-line" multi-phase flow meters have been developed, especially in the petroleum industry. Relatively accurate three phase "partition" measurements can be made using nuclear, acoustic, electromagnetic and a combination of these technologies. As an example, the well known gamma ray attenuation technique can be used to measure an apparent bulk density of a two phase flow comprising liquid and gas. If the bulk density of each phase is known, the partition or fraction of volumes of liquid and gas can be computed from the measured bulk density. The problem lies, however, in determining accurately the linear flow velocities of each of these phases, which is required to convert the partition measurements into corresponding volumetric flow rates. Various relationships have been developed to calculate the relative or slippage velocity of two phases with respect to a measured third phase, but the calculations are replete with assumptions and are only as accurate as the often dubious assumptions. In addition, these devices are usually quite complex both electronically and mechanically, are expensive to fabricate, and are very expensive to maintain and to calibrate.

Neutron sources (14 MeV) have been used to irradiate a composite fluid comprising a water component with neutrons thereby inducing $^{16}N$ in the water phase by means of the $^{16}O(n,p)^{16}N$ reaction. This is usually referred to as an "oxygen activation" type measurement. Linear flow rate of the water phase and even the volumetric flow rate of the water phase can be determined, by measuring gamma radiation resulting from $^{16}N$, which is completely independent of the volumetric flow rates of any other non-oxygen phase of the composite stream. Since the half life of $^{16}N$ is only approximately 6.2 seconds, long term contamination of the fluid does not present a problem. The method yields only flow parameters of the oxygen bearing phase. As an example, fluid produced from oil and gas wells usually comprises oil, water and gas. The neutron activation technique can be used to obtain volumetric flow rate of the water phase only. Since neither the gas or oil phases contain oxygen, no information is obtained concerning the flow of these phases.

To summarize the prior art in multi-phase flow measurements, especially as they pertain to the petroleum industry, no effective and direct techniques are available to measure two or three phase flow in a pipeline that do not exhibit limiting features discussed above. The test separator is capable of giving definitive answers to three phase flow measurements only if all of the various parameters of the previously mentioned three meters measuring the various flows are considered. Other limiting factors of test separator methodology include the dump rate for the liquids being 5 to 10 times the average flow rate, the entrained gas in both the water and the oil expanding as pressure is lowered going through the meter and over-registering the volume of liquids, liquids being carried through the gas meter by the higher velocity and insufficient demisting of this phase, and changes in liquid levels due to the slugging resulting from insufficient separation. These items are more often than not disregarded, thereby resulting in a large percentage of test separator testing on producing wells which overstates the volume ranging from a nominal 10% to values in excess of 100% when compared with sales volumes. As mentioned previously, the test separator technique requires massive, heavy, costly equipment, significant time for complete phase separation, and is certainly not applicable for real time, pipeline measurements where there are often sudden changes in the flow phase composition and flow regimes.

An object of the present invention is to provide multi-phase apparatus and methods to measure volumetric flow rate of one or more phases of a composite fluid, wherein no assumptions are needed concerning the linear flow velocities or the slippage velocities of the multiple phases.

Another object of the present invention is to provide a multi-phase flow measurement system for the petroleum industry, wherein volumetric flow rates of water, oil and possibly gas phases of produced fluids are measured directly and rapidly in a fluid stream flowing within a pipeline.

Still another benefit of the present invention is to provide accurate and precise measures of multiple phases of a fluid flow.

An additional aspect of the invention is to provide a multi-phase flow measurement system which is based upon the measure of radioactive levels, wherein the measuring equipment is extremely accurate and precise thereby allowing the use of very small or "exempt" quantities of radioactive materials which present no human or environmental hazards.

A further feature of the invention is to provide a multi-phase flow measuring system in which the absolute magnitude of measured levels of radioactive materials are not required in order to obtain the desired volumetric flow parameters.

Another object of the present invention is to provide multi-phase flow measurement apparatus which is reliable, inexpensive to manufacture, inexpensive to operate and suitable for rugged field use.

Still another benefit of the invention is to provide suitable calibration apparatus and methods with which the multi-phase flow system can be calibrated, where the invention, properly calibrated, can also serve as a calibration device for other types of multi-phase meters and test separators.

There are other objects and applications of the invention that will become apparent in the following disclosure and appended claims.

SUMMARY OF THE INVENTION

The present invention is based upon the selection of a radioactive material which is soluble in only one phase of a multi-phase fluid, coating this radioactive material with a stable compound of known thickness which is solvent in only the same phase of a multi-phase fluid, depositing first the radioactive material and then the coating compound onto an insert, placing the insert into a flowing stream which comprises the soluble phase, measuring the time required for the known thickness of coating compound to be "washed" away from the insert by the phase in which it is solvent by observing the release of radioactive material into the stream, and determining the flow rate of the solvent phase from the time of release of radioactive material. The time required for the coating to wash away varies inversely with the flow rate of the fluid phase.

The invention will be summarized by using, for purposes of discussion, a multi-phase fluid consisting of oil, water and gas. It should be understood, however, that the methods and apparatus of the invention are equally well suited for measuring multi-phase flow in fluids comprising other phases of liquid and gas, as long as (1) a radioactive material and coating compound which is solvent only in one phase can be deposited on the insert, and (2) the radioactive material emits characteristic radiation which can be quantitatively detected with the detection equipment of the invention. For purposes of brevity, the radioactive materials which are soluble in a given flow phase will simply be referred to as phase soluble isotopes, or "phase isotope". Also for brevity, the coating compounds which are soluble in a given flow phase will simply be referred to as phase soluble coating compounds or "phase coatings".

In measuring the flow rate of the water phase of the example, a preferably thin layer of water soluble isotope is selected and deposited on a "water phase" insert. The water soluble isotope layer is then coated with a water soluble coating of predetermined thickness. The insert is positioned within the flowing multi-phase liquid.

In one embodiment of the invention, the level or activity of radiation, which is characteristic of the decay of the water soluble isotope, is monitored downstream from the insert as a function of time. As the water flows past the insert, water soluble coating compound is removed or "washed" from the insert by the passing water phase. No phase isotope activity is measured while the phase coating is being washed away. The time required to wash away the water soluble coating of known thickness is a function of the volumetric flow rate of the water phase. With a greater volumetric flow rate of water, a shorter period of time is required to remove or wash the water soluble coating from the insert and thereby expose the water soluble radioactive material to the fluid flow. The time required to wash the water soluble coating from the insert is solely a function of the water flow rate, and is not a function of oil or gas flow rate since these phases do not wash water soluble coating from the insert. When the water soluble coating is washed away, the water soluble radioactive material is exposed to the flowing water phase. The water rapidly washes this radioactive material into the flow stream as a "slug" of radioactive material. The passage of this slug is detected downstream from the insert using a suitable radiation detector, and the time of slug passage, measured preferably from the time of insertion of the insert, is also recorded. This time is essentially the time required for the water phase of the flowing fluid to wash away the water phase coating and release the water phase isotope. Water flow rate is calculated from this "phase release time" of water phase isotope.

In another embodiment of the invention, the detector is placed sufficiently near the insert so that the activity level of the material on the insert can be continuously monitored. As in the previous embodiment, the flow of a specific fluid phase washes away the corresponding phase coating. During this process, the measured activity of the phase isotope remains essentially constant (ignoring the half life decay) since phase coating, rather than phase isotope, is being washed from the insert. Once the phase coating has been washed away, the phase isotope is exposed to the fluid flow, and the soluble phase (water in this example) of the flow rapidly washes away the phase isotope, resulting in a rapid decrease of phase isotope activity as measured by the detector. The time at which this decrease occurs is a measure of the phase release time for the water phase of the multi-phase fluid flow. The phase isotope half life can be selected so that half life decay can be accommodated.

Using either the "downstream detector" embodiment or the "adjacent detector" embodiment of the invention, the flow parameter measurement is quantified using a calibration procedure. More specifically, the measurement is quantified by first coating the phase isotope on the insert with a known thickness of phase coating. Next, the phase release time is measured, using either the downstream detector or adjacent detector embodiment, with a known amount or amounts of water flowing through the system. This measurement relates the measured phase release time to the desired phase flow parameters thereby calibrating the system for a specific phase flow. This calibration procedure will be discussed in detail in a subsequent section.

Methodology for measuring flow of the water phase of the multi-phase fluid is also used to measure the oil phase of the fluid. More specifically, an oil soluble isotope is deposited on a second insert or "oil phase" insert. An oil soluble compound of known thickness is then deposited upon the oil phase isotope. The oil phase insert is then inserted into the fluid flow, preferably in the vicinity of the water phase insert. The oil soluble isotope emits characteristic decay radiation which is different and measurably distinguishable from radiation emitted by the water soluble isotope. The flow of oil past the oil phase insert washes or removes only oil soluble coating compound, since this compound is not soluble in water or gas. Once the oil phase coating compound is washed away, oil phase isotope is rapidly released into the flow stream. The oil phase release time, determined with either the downstream or adjacent detector embodiment of the invention, is indicative of the magnitude of the oil phase flow. Preferably a single radiation detector, with sufficient energy resolution and precision, is used to measure phase release time for both the oil and water soluble isotopes. The oil phase flow measurement is quantified by depositing oil soluble radioactive material on the oil phase insert, coating this radioactive material with a known thickness of oil soluble phase coating, and calibrating the system by measuring the oil phase release time with a known amount of oil flowing through the system.

Again, the same methodology can also be used to measure the gas phase of the fluid. A gas soluble radioactive isotope is deposited on a third insert or "gas phase" insert, and then coated with a gas phase coating of known thickness. The gas phase insert is then inserted into the fluid flow preferably in the vicinity of the water and oil phase inserts. Only flow of the gas phase washes gas soluble coating from this insert. The gas phase release time is measured, again preferably using the same detector used to make the water and oil isotope measurements. This change is related to quantitative gas phase flow using previously discussed system calibration techniques.

In summary, one, two or three radioactive isotopes and one, two or three corresponding coating compounds are selected which are soluble in only one phase of a multi-phase fluid, and which isotopes emit measurably distinct decay radiation. Each phase isotope and corresponding phase coating is deposited on an insert and placed in the fluid flow. Each fluid phase washes away its corresponding phase coating depending upon the magnitude of that phase flow. Once the phase coating is washed away, the corresponding phase isotope is released into the fluid flow. If the downstream detector embodiment of the invention is used, a "slug" of radioactive material with measurably distinct emission characteristics is measured by the detector. The times of respective slug releases, measured preferably from the time of insertion of the respective phase inserts, are the defined phase release times, and are related to the volumetric flow rate or the mass flow of their respective phases. If the adjacent detector embodiment is used, the time at which observed phase isotope activity begins to decrease rapidly is a measure of the phase release time.

Using the methods of the invention, the absolute activity of the phase isotopes does not need to be known in order to compute the flow parameters of these corresponding phases. The only requirement is that the activity be sufficient so that the slug passage can be detected and the corresponding phase release time can be computed with suitable accuracy and precision.

BRIEF DESCRIPTION OF THE SYSTEM

The multi-phase flow system comprises one or more inserts which are positioned within the flowing fluid stream, one or more radioactive isotopes which emit photons of characteristic energy are deposited on the inserts, and each of which is soluble in only one flow phase. Each insert is then coated with a coating compound which is also soluble in only the flow phase of the underlying radioactive material. A preferred photon detection system for measuring the passage of slugs of one or more phase isotopes is positioned downstream from the one or more phase inserts, or alternately, adjacent to one or more inserts. For either detector position, the response of the detector as a function of time is used to determine the phase release times for each phase isotope. A computer is used to calculate phase release times for the one or more phase flows, and is also used for converting phase release times into volumetric flow rate and mass flow of the phases. A suitable form of output for the computed parameters of interest is also provided.

Membranes of various types have been used in the prior art to filter or trap various components within gaseous or liquid flow streams. There has been rapid growth in the membrane industry, and these materials have been used to remove toxic substances from industrial gas, removal of specific ions from waste waters, and many other applications. One embodiment of the present invention uses membranes as inserts, and this application is essentially opposite from prior art membrane applications. Phase isotopes are absorbed or adsorbed onto preferably separate membrane inserts. The phase isotopes are then coated with corresponding phase soluble coatings. The phases of the fluid flow then wash away their corresponding phase coatings at a rate proportional to the mass of the phase flow which contacts the membrane, and releases the phase isotope into the flow as a slug once stripped of the phase coating. Either the time of passage of the slug is measured with a down stream detector, or the decrease in activity of the phase isotope on the membrane is measured with an adjacent detector. As stated previously, a given phase isotope and coating is insoluble in any other phases within the flow. Inserts other than membranes, such as metal plates, can alternately be used for mounting the insert materials.

Phase isotopes are selected based upon several criteria. The isotopes must be elements, or compounds, or elements or compounds bound in a carrier material, which are solvent in only one phase of the multi-phase flow. It is also desirable that the isotope exhibit a relatively long half life for operational reasons. Operationally, long half life phase isotopes are more desirable so that they can be deposited on inserts, transported, and stored for long periods of time before use, although the absolute activity level is not needed to determine the desired flow parameters. It is also highly desirable for phase isotopes to emit at least two coincident photons of characteristic energy upon decay. Characteristic energies are used to identify multiple phase isotopes with a single detector. Multiple photon emission allows multiple photon detection (MPD) techniques to be used which are very sensitive. This, in turn, allows relatively small or "exempt" amounts of phase isotopes to be deposited on the inserts, thereby essentially eliminating the possibility of polluting the flow stream with radioactive material washed away by the respective flow phases.

Phase coating materials are also selected based upon phase solubility. Furthermore, it is preferred that the phase coating materials be relatively inexpensive, non toxic, not considered to be a pollutant to the flowing stream of fluid, easy to handle and to deposit upon the respective phase inserts, and be washed from the inserts at a rate which is preferably linearly proportional to the flow of their respective flow phases.

The radiation detector is preferably a multiple photon detection (MPD) system which detects only the emissions of two or more coincident photons from the phase isotopes, an rejects any other detected photon activities as background. As an example, the MPD system can comprise a gamma ray detector and an X ray detector for detecting decay events from phase isotopes which emit coincident gamma and X rays. Alternately, the MPD detection system can comprise two gamma ray detectors positioned at 180 degrees with respect to one another, where coincident 511 KeV annihilation gamma rays are detected resulting from a phase isotope which decays by positron emission. The use of a MPD system allows low level amounts of tracer isotope to be used thereby minimizing risk to humans and the environment by polluting the flowing fluid with significant amounts of radioactive material.

Detector response is input into a computer where it is processed in order to obtain the desired flow parameters of the phases within the liquid stream. As mentioned briefly, the phase release time of a specific phase isotope varies inversely with the mass flow of that phase. A linear inverse proportionality is desired, but not necessary to practice the invention. Data analysis will be discussed in detail in a subsequent section.

Once the desired phase flow parameters have been computed, they are preferably output by the computer to a real time monitor, a suitable storage device such as a disk, and simultaneously printed in tabular form.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of the invention and are therefore not to be considered limiting of its scope, for the invention may admit to other equally effective embodiments.

DETAILED DESCRIPTION OF THE PREFERRED EMBODIMENT

Figure 1A:
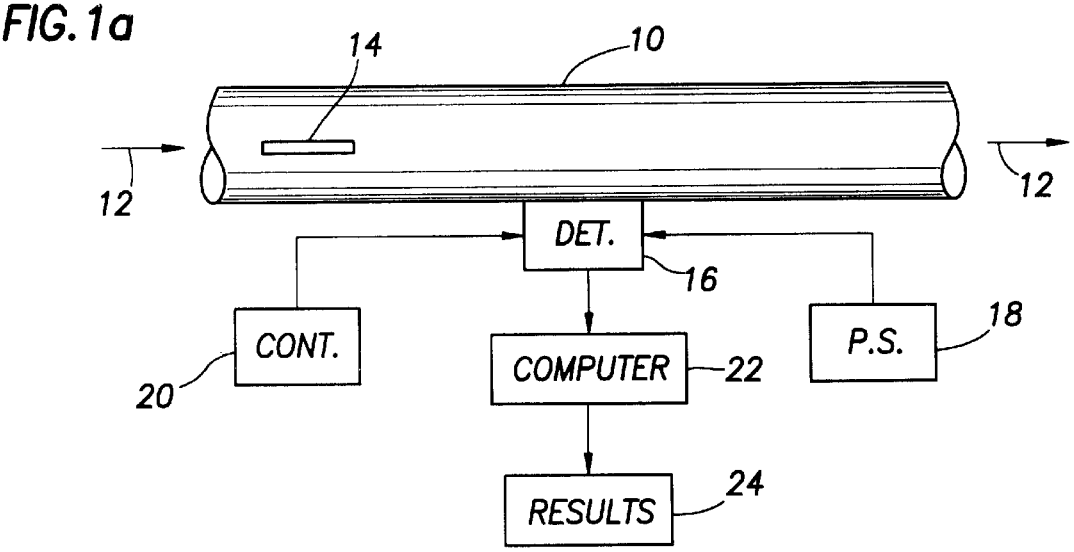
FIG. 1a illustrates the major elements of the multi-phase flow system configured to measure flow characteristics of one phase in the presence of other phases using a downstream detector embodiment.

Attention is directed to FIG. 1a which illustrates the primary elements of the multi-phase flow system using the downstream detector configuration. For purposes of illustration, it will initially be assumed that the system is configured to measure only one phase of the multi-phase fluid, flowing in the direction of the arrows 12, and flowing within a pipe 10.

Still referring to FIG. 1a, a single insert is depicted in the pipe 10 and identified by the numeral 14. It has been found that the use of membranes for inserts in the form of standard strainers is not practical because this geometry significantly perturbs the flow, and the phase coating is not washed from the insert by the corresponding phase in a manner indicative of true phase flow. These problems are minimized by positioning the planar insert 14 essentially parallel to the flow 12. It may, however, be advantageous to position the planar insert 14 at a small angle with respect to the direction of the flow 12, and to thoroughly mix and condition the stream just prior to the membrane to eliminate any inconsistency due to stratified or segmented flow. The insert can be made of membrane material or other material such as a metal plate substrate. For purposes of illustration, it will be assumed that the insert is made of membrane material. Membranes 14 made of nylon, paper, acrylic polymer and ceramic material, commercially supplied by Whitman, Amersham and Millipore, have been used in the system. The preferred membrane material is Nafion supplied commercially by DuPont. In selecting a suitable membrane material, consideration must be given to the miscellaneous mechanisms of membrane action, the physical and structural characteristics, and materials from which it is made. Membrane technology is summarized in *Membrane Processes*, R. Rautenbach and R. Albrecht (translated by V. Cottrell), John Wiley & Sons, New York, 1991, and *Inorganic Membrane synthesis, Characteristics and Applications*, R. R. Bhave, Van Nostrand Reinhold, New York, 1991.

Figure 1B:
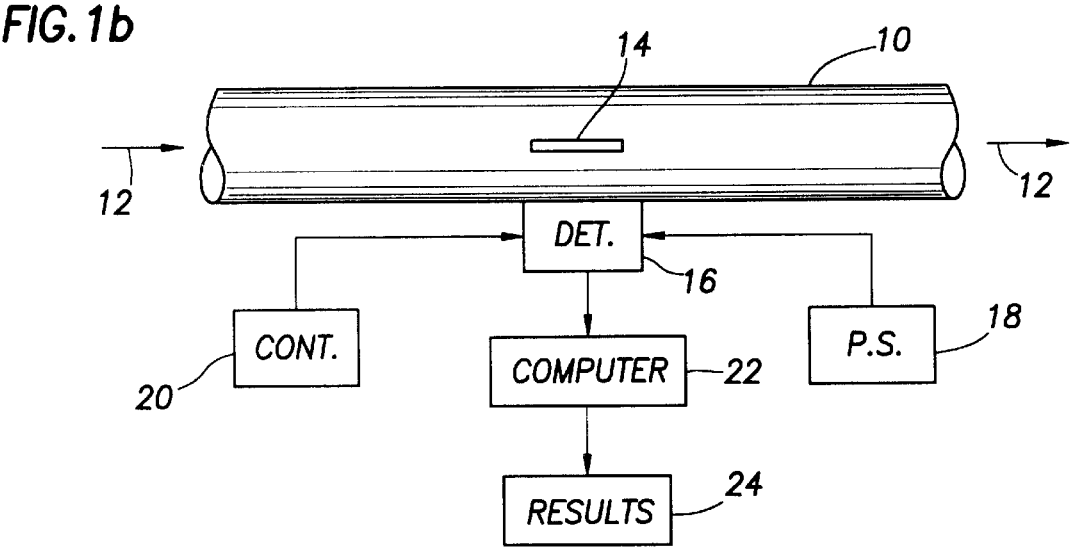
FIG. 1b illustrates the major elements of the multi-phase flow system configured to measure flow characteristics of one phase in the presence of other phases using an adjacent detector embodiment.

FIG. 1b illustrates the primary elements of the multi-phase flow system using the adjacent detector configuration.

Again, it will initially be assumed that the system is configured to measure only one phase of the multi-phase fluid, flowing in the direction of the arrows 12, and flowing within a pipe 10. The detector 16 is positioned sufficiently close to the insert 14 to respond to the activity of the radioactive material deposited upon the insert.

Figure 2:
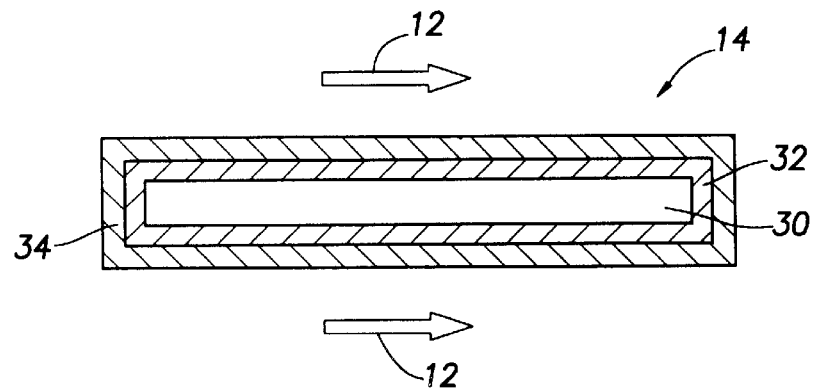
FIG. 2 shows detail of a phase insert.

FIG. 2 illustrates in more detail the structure of the insert 14. The insert comprises a core 30 which, for purposes of illustration, has been assumed to be membrane material. Alternately, the core 30 can be metal or other suitable solid substrate such as plastic. A suitable phase isotope 32 is selected for deposition on the core 30. Prospective isotopes must be elements, or compounds, or elements or compounds bound in a carrier material which is solvent in only one phase of the multi-phase flow 12. It is also desirable that the isotope exhibit a relatively long half life for operational reasons. Operationally, long half life phase isotopes are desirable so that they can be deposited on inserts, transported, and stored for long periods of time before use, although the absolute activity of the isotope material 32 need not be known in order to determine the corresponding phase flow parameters. The phase isotope material 32 is then covered completely with a phase coating material 34 of predetermined thickness. As mentioned previously, the phase coating 34 and the phase isotope 32 are soluble in only one phase of the multi-phase flow 12. When flow of the phase washes away the phase coating 34, the isotope material 32 is rapidly washed from the insert core 30 and released into the fluid flow as a slug. A total wash out time of the phase coating 34 is preferably as low as 10 to 20 minutes, and the time to wash the exposed isotope material 32 from the core 30 is preferably less than one minute. For operational purposes, it is desirable for the half life of the phase isotope material 32 to be greater than 10–20 hours, and preferably greater than 40–50 days. As mentioned previously, it is also highly desirable for phase isotopes to emit at least two coincident photons of characteristic energy upon decay. Characteristic energies are used to identify multiple phase isotopes with a single detector, and to trigger coincident counting detectors. Multiple photon emission allows multiple photon detection (MPD) techniques to be used noting that these are very sensitive. This, in turn, allows relatively small or "exempt" amounts of phase isotopes to be deposited on the inserts, thereby essentially eliminating the risk of polluting the flow stream with radioactive material washed away by the respective flow phases. More than 100 isotopes are compatible with MPD requirements. A list of suitable phase isotopes is presented in U.S. Pat. No. 5,532,122 to Andrzej K. Drukier, which is hereby entered in this disclosure by reference.

Sodium-22 ($^{22}$Na) meets the stated criteria for a phase isotope 32 and will be discussed in detail as an example. The half life of $^{22}$Na is 2.58 years, and it is commercially available in the form of water solutions of its chloride. While the isotope can also be used as an oil soluble phase isotope, the following example will describe the deposition of a water soluble isotope. The radioactive material 32 is preferably adsorbed on the membrane core 30 to yield a total activity of approximately 40 nanoCuries (nCi), or alternately within the preferred range of 25–50 nCi. If the available radioactive source contains 1 $\mu$Ci in 5 milliliters (mL), about 200 mL of solution is absorbed on the membrane and evaporated under the flow of air at room temperature.

Polyethylene glycols and similar polymers have been applied to controlled release of drugs into the blood stream. Due to their poor mechanical properties, these polymers are not suitable for use as water phase coating material 34.

Polycrylic acids, polycrylic amides, polyvinylbenzene-sulfonic acids, polysaccharides, and some relevant copolymers have been used as suitable water soluble phase coatings. Polyacrylates, and polymetacrylates, polyalkenes, polystyrene and its derivatives have been used as oil soluble phase coatings. Other materials which are soluble in corrosive components of natural gas are suitable for use as gas phase coating material.

Again referring to FIGS. 1a and 1b, the activity on the insert 14 is preferably measured with a MPD detector 16 positioned against the outer wall of the pipe 10 and downstream from (FIG. 1a), or adjacent to (FIG. 1b), the insert membrane 14. A control circuit 20 controls the coincidence counting of the detector 16, and pulse shape discrimination and background rejection as disclosed in the previously referenced U.S. Pat. No. 5,532,122 to Andrzej K. Drukier. The detector 16 is also powered by suitable power supplies 18. Passage of the released slug of the phase isotope 32 ($^{22}$Na in this example) is measured by the detector 16 thereby yielding the phase release time as computed a computer 22. The computer 22 processes these data using methodology to be discussed in the following section, and outputs the desired phase flow parameters in the form of results 24 which can be printed tabulations or any type of display or memory unit.

As mentioned previously, the systems depicted in FIGS. 1a and 1b are configured to measure only one phase in the multi-phase flow 12, and in the previous example, the phase isotope was selected to measure the water phase. $^{22}$Na can also be incorporated as an oil soluble phase isotope for use with a suitable oil soluble coating. Other isotopes such as $^{60}$Co can be used as water or oil phase isotopes, if the isotope is in a compound or in a material which is solvent only in the desired fluid phase such that it is released as a slug within that phase once the coating has washed away. Gas phase isotopes can comprise krypton or xenon isotopes, where the license exempt levels of these activities is relatively high. The use of some noble gas radioisotopes as gas phase isotopes would require operation of the MPD detector 16 in a non-coincidence mode since some isotopes do not decay by the emission of two or more coincident photons. Argon does have an isotope which provides coincident radiation.

Referring again to FIGS. 1a and 1b, the radiation detector 16 is preferably a MPD system which detects only the emissions of two or more coincident photons from the phase isotopes, and rejects any other detected photon activities as background. As an example, the MPD detector system 16 can comprise a gamma ray detector (shown) and an X ray detector for detecting decay events from the phase isotope 32, deposited on the core 30, which emits coincident gamma and X rays. Such a system is disclosed in detail in U.S. Pat. No. 5,532,122 to Andrzej K. Drukier which was previously entered by reference. Gamma rays are detected preferably with an inorganic scintillator such as NaI or CaF$_2$ crystals. Coincident X rays are preferably detected using a Ge semiconductor detector which is optimized for detection of X rays. Suitable coincident circuitry is provided in the control circuitry 20, and background rejection criteria are disclosed in detail by Drukier. Background is further reduced by the strategic placement of collimated, graded shielding (not shown in FIGS. 1a and 1b). Alternately, the MPD detection system 16 can comprise two gamma ray detectors positioned at 180 degrees with respect to one another, where coincident 511 KeV annihilation gamma rays are detected resulting from a phase isotope which decays by positron emission. The detector 16 can be operated in a non-coincidence mode, and the phase activity can be measured solely by detecting photon emission at one or more characteristic energy. This mode of operation is required in detecting selected noble gas phase isotopes. The signal to noise ratio of such a system is considerably greater than that of the detector operating in the coincidence mode, and requires the use of more gas phase isotopic material to obtain statistically significant phase flow measurements.

DATA PROCESSING

The processing of the measured phase release time, and how this measurement is related to flow parameters of that phase, will be presented for a single phase flow. This methodology applies to two or more flows, with the only difference being that different isotopic activities are measured for different phases.

Figure 3A:
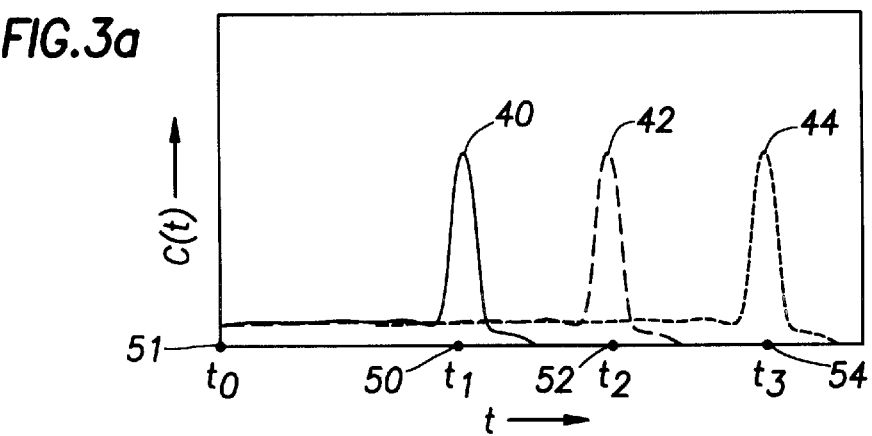
FIG. 3a illustrates down stream detector response to a single phase of fluid flowing at three different flow rates, and the determined phase release times associated with each of these flow rates.

FIG. 3a illustrates a plot of the measured activity, from the downstream detector 16 shown in FIG. 1a, of a phase isotope, C(t), measured as a function of time t, and plotted as a function of t for various phase volumetric flow rates V. The quantity C(t) is plotted along the ordinate, and t is plotted along the abscissa. The time $t_0$ is a reference time, preferably the time at which the insert 14 is placed into the flow 12, and is plotted as a point 51 at the origin. Initially, the detector 16 detects only background radiation C(t) as the phase fluid flow washes away the non radioactive coating 34 from the insert 14. Once the phase coating 34 has been washed away, the phase isotope material 32 is exposed to the phase flow, is rapidly washed away by this flow, and is deposited within the flow 12 as a slug of radioactive material. As this slug flows past the detector 16, a sharp increase or "peak" 40 in C(t) is recorded by the detector 16 with a maximum value at a time $t_1$ denoted by the point 50. The time $t_1$ represents the phase release time for a volumetric flow rate $V_1$. FIG. 3a also illustrates a second peak 42 with a maximum value occurring at a time $t_2$ denoted by the point 52. This is the phase release time for a second volumetric flow rate $V_2$ which is less than $V_1$ since more time is required to wash away the phase coating 34 and release the phase isotope 32 into the flow 12. FIG. 3 shows still another peak in measured activity C(t) centered at a time $t_3$ which is represented by the point 54. The time $t_3$ represents a phase release time for a phase volumetric flow rate $V_3$, which is less than $V_2$ since even more time is required to wash away the phase coating 34. FIG. 3a clearly illustrates a previously stated principle of the invention wherein the phase release time is inversely related to the magnitude of the volumetric flow rate of that phase.

Figure 3B:
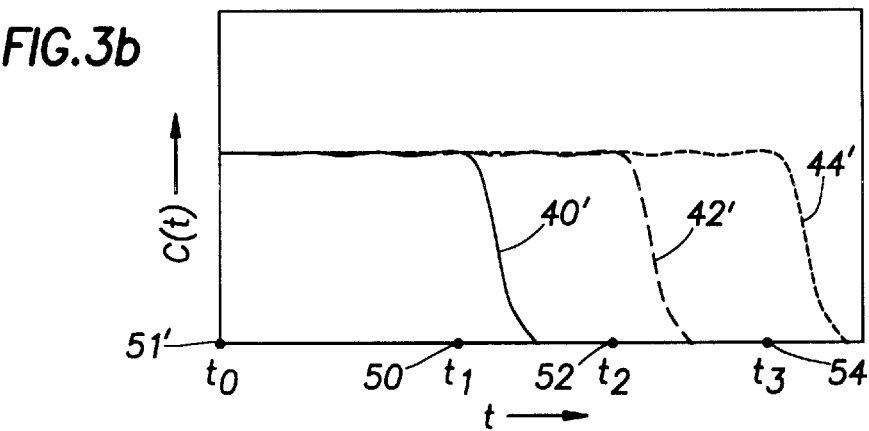
FIG. 3b illustrates adjacent detector response to a single phase of fluid flowing at three different flow rates, and the determined phase release times associated with each of these flow rates.

FIG. 3b illustrates a plot of the measured activity, from the adjacent detector 16 shown in FIG. 1b, of a phase isotope, C(t), measured as a function of time t, and plotted as a function of t for various phase volumetric flow rates V. The quantity C(t) is plotted along the ordinate, and t is plotted along the abscissa. The time $t_0$ is a reference time, preferably the time at which the insert 14 is placed into the flow 12, and is plotted as a point 51 at the origin. Initially, the detector 16 measures a constant level of radiation C(t) from the phase isotope 32 as the phase fluid flow washes away the non radioactive coating 34 from the insert 14. Once the phase coating 34 has been washed away, the phase isotope material 32 is exposed to the phase flow, is rapidly washed away by this flow and is transported from the vicinity of the detector 16. This results in a rapid or sharp decrease in the activity in C(t), as recorded by the detector 16 and depicted by the curve 40', at a time $t_1$ denoted by the point 50. The time $t_1$ represents the phase release time for a volumetric flow rate $V_1$. FIG. 3b also illustrates a second measured activity curve 42', with a rapid or sharp decrease occurring at a time $t_2$ denoted by the point 52. This is the phase release time for a second volumetric flow rate $V_2$ which is less than $V_1$ since more time is required to wash away the phase coating 34 and release the phase isotope 32 into the flow 12. FIG. 3b shows still another measured activity C(t) depicted by the curve 44', which decreases rapidly at a time $t_3$ which is represented by the point 54. The time $t_3$ represents a phase release time for a phase volumetric flow rate $V_3$, which is less than $V_2$ since even more time is required to wash away the phase coating 34. FIG. 3b, like FIG. 3a, clearly illustrates a previously stated principle of the invention wherein the phase release time is inversely related to the magnitude of the cumulative volumetric flow of that phase.

Figure 4:
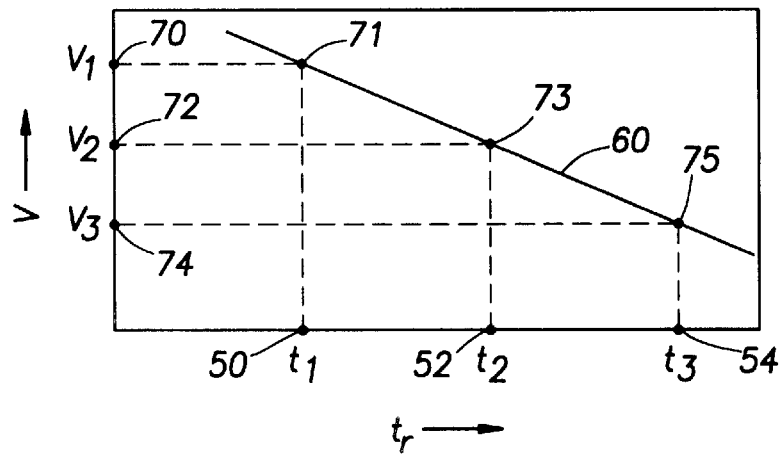
FIG. 4 illustrates graphically the conversion of measured phase release times into corresponding volumetric flow rates for that phase.

Either the downstream detector configuration or the adjacent detector configuration of the invention can be used to measure the phase release time, $t_r$. A method for converting measured phase release times, $t_r$, into corresponding quantitative volumetric flow rate values V, is illustrated graphically in FIG. 4. FIG. 4 is a plot of V as a function of $t_r$, where V is plotted along the ordinate and $t_r$ is plotted along the abscissa. A curve 60, which relates V to $t_r$ for a given phase insert, is a "calibration" curve for the system and is determined by measuring phase release times for known volumetric flow rates of that phase of the fluid flowing within the system. Using the examples of phase release time used in FIG. 3, the phase release time $t_r=t_1$ is entered at the point 50, a vertical line is extended from this point until it intersects the curve 60 at a point 71, and then a horizontal line is extended from the point 71 until it intersects the ordinate at a point 70. The point 70 represents the volumetric flow rate $V_1$ which corresponds to the measured phase release time $t_1$. The second measured phase release time $t_r=t_2$ is plotted as the point 52 on the abscissa, the vertical intercept point 73 is determined on the calibration curve 60, and the horizontal intersect point 72 is determined on the ordinate thereby yielding the corresponding volumetric flow rate $V_2$. Finally, the third measured phase release time $t_r=t_3$ is plotted as the point 54 on the abscissa, the vertical intercept point 75 is determined on the calibration curve 60, and the horizontal intersect point 74 is determined on the ordinate thereby yielding the corresponding volumetric flow rate $V_3$.

It should be understood that the graphical solution shown in FIG. 4 is presented for the purpose of illustrating the concept for the conversion of the measured phase release times, $t_r$, into the quantities of interest which are the corresponding phase volumetric flow rates V. In the preferred embodiment of the invention, the solution is performed mathematically using the computer 22 illustrated in FIGS. 1a and 1b.

Figure 7A:
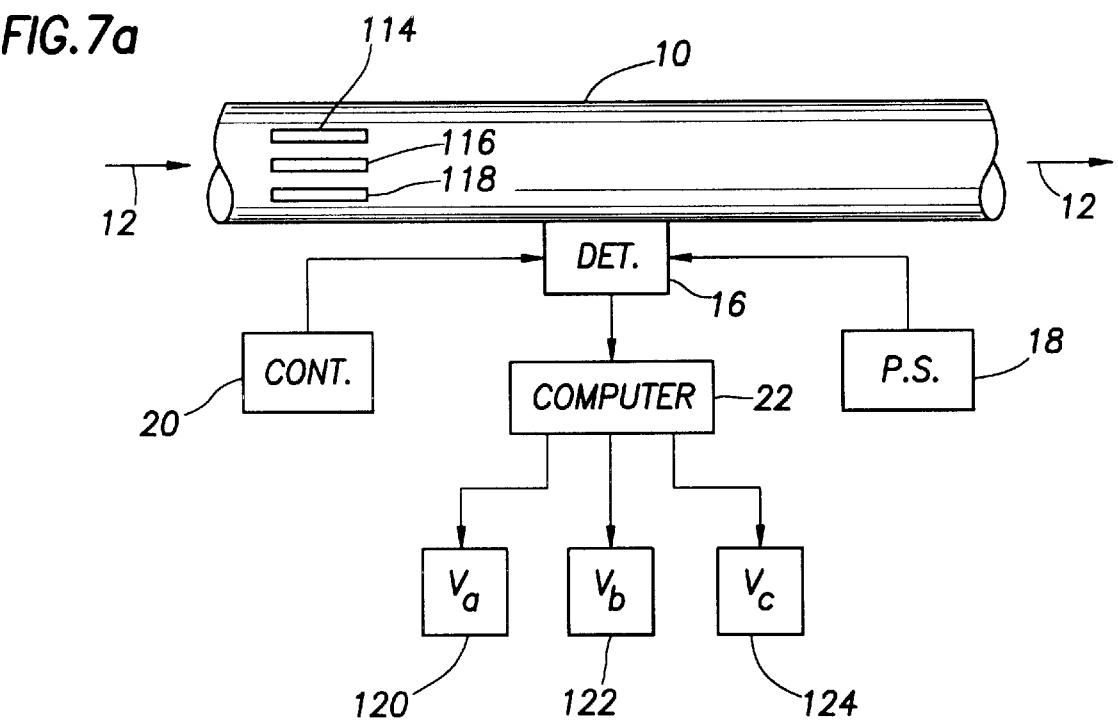
FIG. 7a illustrates the multi-phase flow system using a down stream detector and configured to simultaneously measure flow parameters for three phases of a fluid.

The previous examples have been limited to determining flow parameters of only one phase of a multi-phase fluid. FIG. 7a illustrates the system, configured with a downstream detector 16, to measure flow parameters of three phases, such as water, oil and gas, of the flowing fluid 12. Each of three inserts 114, 116, and 118 contains a phase isotope 32 (see FIG. 2) whose slug decay activity can be readily resolved with the single downstream detector 16, and which is soluble in only one phase. This allows the phase release time for each flow phase to be measured with the single detector 16. Each of three inserts 114, 116, and 118 is also coated with a phase coating 42 (see FIG. 2) which is soluble in only one phase. An alternate embodiment of the invention uses a separate downstream detector to measure the passage of each phase isotope slug and, therefore, the phase release time, $t_{r,i}$, for each phase "i". These phase release time measurements are input into the computer 22 and processed to yield the desired flow parameters (i=a, b, c), denoted generically as $V_a$, $V_b$ and $V_c$ in the recorders 120, 122, and 124, respectively.

Figure 5A:
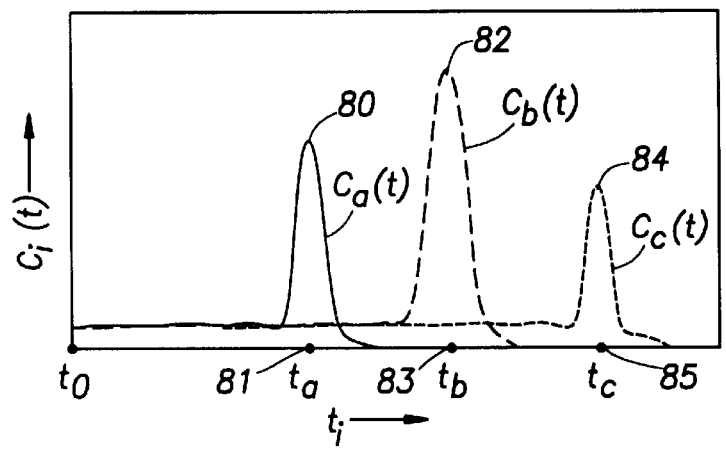
FIG. 5a illustrates downstream detector response to three phases in a multi-phase fluid flow, and the determined phase release times for each phase.

FIG. 5a is a plot of $C_i(t)$ versus t, where $C_i(t)$ is defined as the activity measured by the downstream detector 16 (see FIG. 7a) resulting from the phase isotope i. The activity $C_a(t)$ from the phase isotope i=a forms a peak 80 at a time $t_a$, which is represented by a point 81 and which represents the phase release time for the flow phase a. The activity $C_b(t)$ from the phase isotope i=b forms a peak 82 at a time $t_b$, which is represented by a point 83 and which represents the phase release time for the flow phase b. Finally, the activity $C_c(t)$ from the phase isotope i=c forms a peak 84 at a time $t_c$, which is represented by a point 85 and which represents the phase release time for the flow phase c. Since the detector 16 preferably distinguishes and resolves activities from each phase isotope i=a, b, and c, the results shown in FIG. 5a are obtained directly from the detector 16. Stated another way, the detector 16 preferably measures up to three phase release times for three phases of a multi-phase flow. The sequence of peaks in FIG. 5a can be altered without problems because the three peaks are distinctive. Each passing isotope is selected to provide a unique signature.

Figure 7B:
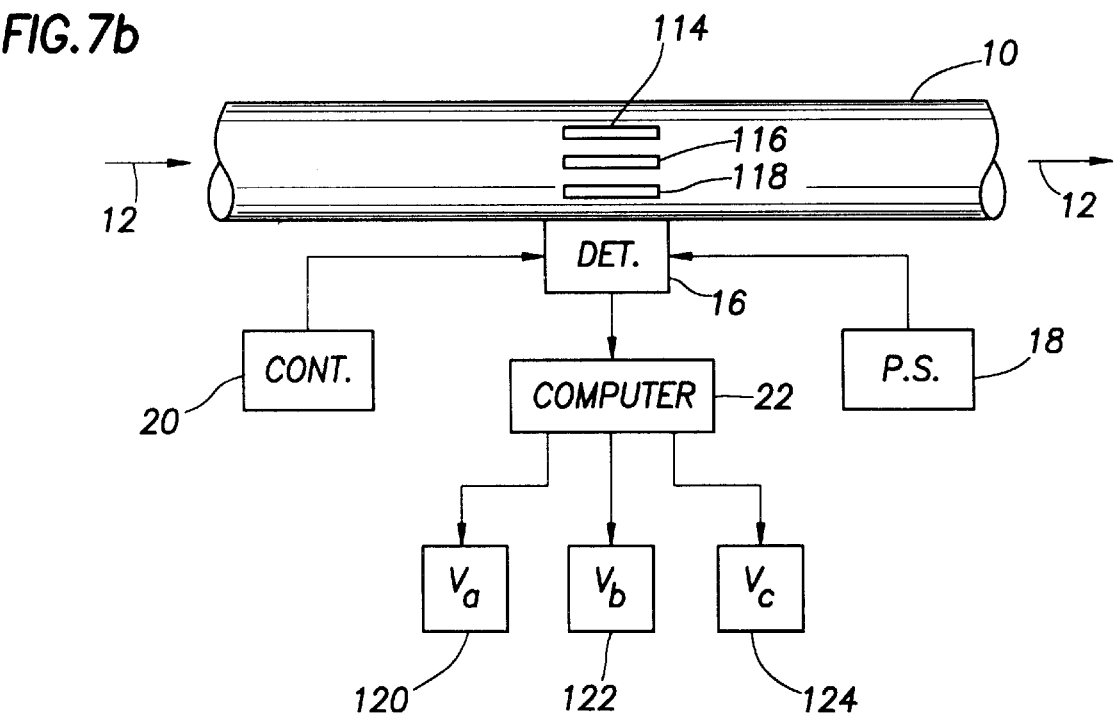
FIG. 7b illustrates the multi-phase flow system using a down stream detector and configured to simultaneously measure flow parameters for three phases of a fluid.

FIG. 7b illustrates the system configured with an adjacent detector 16 to measure flow parameters of three phases of the flowing fluid 12. Again, oil, water and gas will be used to illustrate the three phase measurement using this embodiment of the invention. Each of three inserts 114, 116, and 118 contains a phase isotope 32 (see FIG. 2) whose slug decay activity can be readily resolved with the single adjacent detector 16, and which is soluble in only one phase. This allows the phase release time for each flow phase to be measured with the single detector 16. Each of three inserts 114, 116, and 118 is also coated with a phase coating 42 (see FIG. 2) which is soluble in only one phase. An alternate embodiment of the adjacent detector version of the invention would employ a separate adjacent detector to monitor the phase isotope level on each insert and, therefore, the phase release time $t_{r,i}$, for each phase "i". Once again, these phase release time measurements are input into the computer 22 and processed to yield the desired flow parameters (i=a, b, c), denoted generically as $V_a$, $V_b$ and $V_c$ for the recorders 120, 122, and 124, respectively.

Figure 5B:
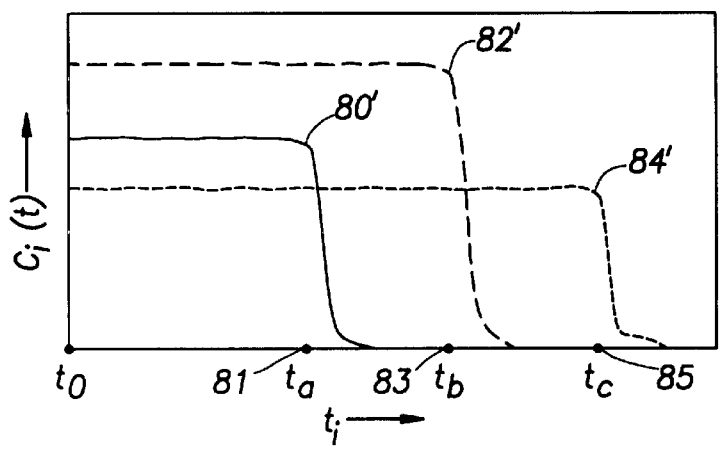
FIG. 5b illustrates adjacent detector response to three phases in a multi-phase fluid flow, and the determined phase release times for each phase.

FIG. 5b is a plot of $C_i(t)$ versus t, where $C_i(t)$ is defined as the activity measured by the adjacent detector 16 (see FIG. 7b) resulting from the phase isotope i. The activity $C_a(t)$ from the phase isotope i=a is essentially a constant activity during the time that the phase coating is being washed away, as illustrated by the curve 80'. Once the phase coating is washed away, the activity level begins to drop rapidly at a time $t_a$, which is represented by a point 81 and which again represents the phase release time for the flow phase a. The activity $C_b(t)$ from the phase isotope i=b is represented by a curve 82' at a time $t_b$, which is represented by a point 83 and which represents the phase release time for the flow phase b. Finally, the activity $C_c(t)$ from the phase isotope i=c is represented by the curve 84' and which decreases rapidly at a time $t_c$, which is represented by a point 83 and which represents the phase release time for the flow phase c. Since the detector 16 preferably distinguishes and resolves activities from each phase isotope i=a, b, and c, the results shown in FIG. 5b are obtained directly from the detector 16. Stated another way, the detector 16 preferably measures up to three phase release times for three phases of a multi-phase flow. Again, each isotope is unique and can be readily distinguished.

The phase release times, $t_{r,i}$, can be measured with the invention configured with a downstream detector 16 (see FIG. 7a) or and adjacent detector (see FIG. 7b), using the corresponding data analysis methods shown graphically in FIGS. 5a and 5b, respectively. The next step in the data analysis process involves the conversion of measured phase release times, $t_{r,i}$ (i=a, b, c) into corresponding phase volumetric flow rates $V_i$. This conversion process is illustrated graphically in FIG. 6, and follows the methods for the single phase interpretation previously illustrated in FIG. 4. The curve $K_a$, identified by the numeral 94, represents the calibration curve for the phase a of the multi-phase flow. Using the example illustrated in FIG. 5, the measure phase release time $t_a$ is plotted at the point $t_a$ on the $t_{r,i}$ abscissa, a vertical line is extended from the point until it intersects the $K_a$ calibration curve 90 at a point 86, a horizontal line is extended from the point 86 until in intersects the ordinate $V_i$ at a point 91 thereby defining the volumetric flow rate $V_a$ for the phase a. The measure phase release time $t_b$ is then plotted at the point $t_b$ on the $t_{r,i}$ abscissa, a vertical line is extended from the point until it intersects the $K_b$ calibration curve 92 at a point 87, a horizontal line is extended from the point 87 until in intersects the ordinate $V_i$ at a point 93 thereby defining the volumetric flow rate $V_b$ for the phase b. Finally, the measure phase release time $t_c$ is plotted at the point on the $t_{r,i}$ abscissa, a vertical line is extended from the point $t_c$ until it intersects the $K_c$ calibration curve 94 at a point 88, a horizontal line is extended from the point 88 until in intersects the ordinate $V_i$ at a point 95 thereby defining the volumetric flow rate $V_c$ for the phase c.

Figure 6:
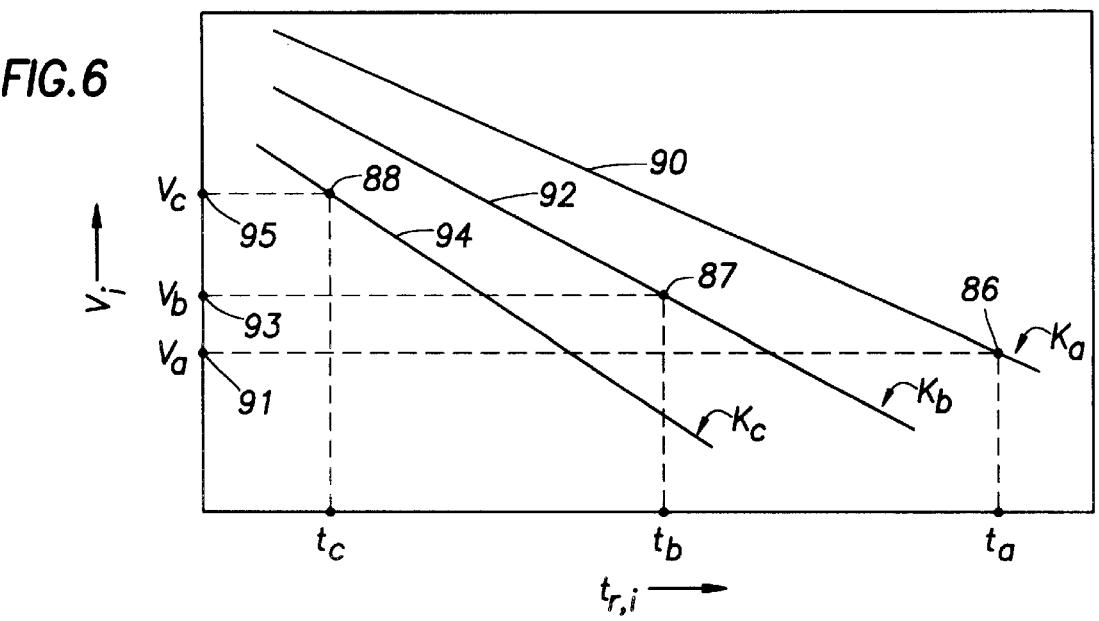
FIG. 6 illustrates graphically the conversion of measured phase release times for multiple phases into corresponding volumetric flow rates.

As discussed previously, the calibration curves $K_a$, $K_b$, and $K_c$ are obtained by measuring phase release times $t_{r,a}$, $t_{r,b}$ and $t_{r,c}$ with known volumetric flow rates $V_a$, $V_b$ and $V_c$, respectively, flowing through the system. Furthermore, the graphical solution of FIG. 6 is presented only to illustrate the data processing methodology, and the actual computations of the phase volumetric flow rates $V_a$, $V_b$, and $V_c$ are made using the computer 22 illustrated in FIGS. 7a and 7b. It should be understood that for purposes of generality, the multiple phases have been designated as "a", "b" and "c". The preferred use of the invention is to measure the oil, gas and water phases of a multi-phase fluid. The generic subscript notation would then be replaced with specific "oil", "gas" and "water" designation.

It is also noted that the inserts 114, 116, and 118 depicted in FIGS. 7a and 7b can be replaced by a single insert (not shown), wherein multiple phase isotopes and phase coatings are applied to portions or "partitions" of this single insert. The typical application will use two isotopes, one being oil soluble and one for water. Many oil wells produce oil and water with almost no gas. That typical measurement need is solved with two isotopes.

SUMMARY

The above disclosure presents a multi-phase fluid flow measuring systems which meets all of the stated objects of the invention. While the foregoing disclosure is directed to the preferred embodiments of the invention, the scope thereof is determined by the claims which follow.

What is claimed is:

1. An apparatus for measuring a flow parameter of a fluid flow, comprising:
   (a) an insert;
   (b) a soluble radioactive material deposited upon said insert; and
   (c) a soluble coating material initially covering said radioactive material, wherein said flow parameter is determined from a measure of the time required for said coating material to wash from said insert by said fluid flow thereby releasing said radioactive material into said fluid flow.

2. The apparatus of claim 1 further comprising a detector to measure activity of said radioactive material.

3. The apparatus of claim 2 wherein said detector is positioned down stream from said insert to detect said radioactive material after release.

4. The apparatus of claim 2 wherein said detector is positioned adjacent to said insert to detect the release of said radioactive material by measuring the activity of said radioactive material on said insert.

5. The apparatus of claim 3 wherein:
   (a) said detector measures passage of said slug of released radioactive material in said fluid flow by detecting decay activity; and
   (b) means to determine release time for said radioactive material.

6. The apparatus of claim 1 wherein said insert comprises a membrane.

7. The apparatus of claim 6 wherein said radioactive material is absorbed in said membrane.

8. The apparatus of claim 1 wherein said flow parameter is determined in a computer, by means of a predetermined relationship, from said release time, wherein said predetermined relationship is determined by:
   (a) flowing a known amount of fluid through said apparatus;
   (b) measuring the release of radioactive material from said insert resulting from said coating being washed from said insert; and
   (c) determining in said computer said release time by measuring the time at which said release of radioactive material occurs.

9. An apparatus for measuring one or more phase flow parameters of a multi-phase fluid flow, comprising:
   (a) at least one insert;
   (b) radioactive phase isotope material supported by said insert;
   (c) phase coating material over said phase isotope material; and
   (d) a detector, wherein:
   (e) said coating material is soluble in only one phase of said multiphase flow;
   (f) said phase isotope is soluble only in the same phase of said multi-phase flow;
   (g) a phase release time required to wash said phase coating from said at least one insert is determined by measuring, with said detector, release of said soluble phase isotope into said multi-phase flow stream; and
   (h) said one or more phase flow parameters are determined from said release time.

10. The apparatus of claim 9 wherein said detector is positioned downstream from said at least one insert to measure said release time.

11. The apparatus of claim 9 wherein said detector is positioned adjacent to said at least one insert to measure said release time.

12. The apparatus of claim 9 comprising two or more phase isotopes, wherein each phase isotope is soluble in only one phase of said multi-phase flow and each of said phase isotopes is under a phase soluble coating material thereover.

13. The apparatus of claim 12 comprising two or more inserts each having a phase isotope thereon.

14. The apparatus of claim 12 wherein each said phase isotopes decays by the emission of photons of characteristic energy, and said detector measures said release times by detecting said photons of characteristic energy.

15. The apparatus of claim 12 wherein a single said phase isotopes is absorbed on a single membrane.

16. The apparatus of claim 9 wherein said one or more phase flow parameters of said multi-phase fluid flow are determined, by predetermined relationships, from said phase release times, wherein said predetermined relationships are determined in a computer responsive to:

(a) flowing a known amount of each phase fluid through said apparatus;

(b) measuring the phase release time for that phase fluid; and (c) combining said known amount of each phase fluid flow and each corresponding release time to derive said predetermined relationship.

17. A method for measuring a flow parameter of a fluid flow, comprising the steps of:

(a) depositing radioactive material upon an insert;

(b) covering said radioactive material with a coating material; and (c) measuring the time required for said coating to wash from said insert thereby releasing said radioactive material into said fluid flow.

18. The method of claim 17 further comprising the step of measuring activity of said radioactive material.

19. The method of claim 18 comprising the additional step of positioning said detector down stream from said insert to detect released radioactive material.

20. The method of claim 18 comprising the additional step of positioning said detector adjacent to said insert to detect said radioactive material.

21. The method of claim 19 wherein:

(a) said detector measures passage of a slug of released radioactive material in said fluid flow; and (b) determining a release time for said radioactive material from the time at which passage is measured.

22. The method of claim 17 wherein said radioactive material is absorbed in a membrane.

23. The method of claim 17 wherein said flow parameter is determined, from a predetermined relationship dependent on release time, and wherein said predetermined relationship is determined by;

(a) flowing a known amount of fluid through said apparatus;

(b) measuring the release of radioactive material from said insert resulting from said coating being washed from said insert by said flow; and (c) determining said release time by measuring the time at which said released radioactive material occurs.

24. The apparatus of claim 17 wherein said flow parameter is volumetric or mass flow rate.

25. A method for measuring one phase flow parameter of a multi-phase fluid flow, comprising:

(a) depositing a radioactive phase isotope material upon an insert;

(b) depositing a phase coating material over said phase isotope material; and (c) washing said phase coating until removal wherein said washing is by only one phase of said multiphase flow and said phase isotope is soluble only in the same phase of said multi-phase flow;

(d) measuring phase release time to wash said phase coating from said insert; and (e) determining a phase flow parameter from said phase release time.

26. The method of claim 25 comprising the additional step of positioning said detector downstream from said insert to measure said release time.

27. The method of claim 25 comprising the additional step of positioning said detector adjacent to said insert to measure said release time.

28. The method of claim 25 comprising the additional step of providing two phase isotopes, wherein each phase isotope is soluble in separate and different phases of said multi-phase flow.

29. The method of claim 25 comprising the additional step of providing two inserts wherein uniquely different phase isotopes are each deposited on said inserts.

30. The method of claim 25 wherein each of said phase isotopes uniquely decays by the emission of photons of characteristic energy, and measuring said release times by detecting said photons of characteristic energy.

31. The method of claim 25 comprising the additional step of determining at least two phase flow parameters of a multi-phase fluid flow, using predetermined relationships from said phase release times, wherein said predetermined relationships are determined by:

(a) flowing a known amount of each phase fluid through a pipe;

(b) measuring the phase release time for each of the phase fluids; and (c) combining the known amount of each phase fluid flow and measured release time to derive said predetermined relationship.

32. The method of claim 31 wherein said phase flow parameters include volumetric or mass flow rate.

33. The method of claim 31 wherein the pipe flows oil and water.

* * * * *